(12) United States Patent
Kodama

(10) Patent No.: US 6,374,262 B1
(45) Date of Patent: Apr. 16, 2002

(54) RELATIONAL DATABASE SYNCHRONIZATION METHOD AND A RECORDING MEDIUM STORING A PROGRAM THEREFORE

(75) Inventor: Michiteru Kodama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,030

(22) Filed: Sep. 1, 1998

(30) Foreign Application Priority Data

Mar. 25, 1998 (JP) .......................................... 10-076875

(51) Int. Cl.⁷ ............................................. G06F 17/30
(52) U.S. Cl. ........................................ 707/201; 714/12
(58) Field of Search ........................... 707/1, 200, 201; 714/12, 14

(56) References Cited

U.S. PATENT DOCUMENTS 5,706,509 A * 1/1998 Man-Hak Tso ............... 707/10
5,924,096 A * 7/1999 Draper et al. .................. 707/10
5,991,771 A * 11/1999 Falls et al. .................... 707/202

FOREIGN PATENT DOCUMENTS

JP 7-230442 8/1995
JP 9-91184 4/1997

* cited by examiner

Primary Examiner—Hosain T. Alam
Assistant Examiner—Jean Bolte Fleurantin
(74) Attorney, Agent, or Firm—Staas & Halsey, LLP

(57) ABSTRACT

A relational database synchronization method for synchronizing master data with data of replica machines, which data is updated usually with the replica machines disconnected from a master machine, so that there may be no inconsistency among the data. After a replica machine is connected to the master machine via a network at an arbitrary time, it extracts records of which the day of last update is later than a master differential extraction completion time, from replica data as replica differentials, and the master machine extracts records of which the replica differential reflection time is later than the master differential extraction completion time, from the master data as master differentials, updates the master differential extraction completion time to the current time, and causes the replica differentials to be reflected in the master data. The replica machine then causes the master differentials to be reflected in the replica data and updates the master differential extraction completion time. This completes the synchronization process and the connection with the master machine may be cut off thereafter at an arbitrary time.

10 Claims, 17 Drawing Sheets

DUPLICATION MANAGEMENT TABLE

| USER NO. | GROUP NO. | MASTER DIFFERENTIAL EXTRACTION COMPLETION TIME | OTHER ITEMS |
|---|---|---|---|
| 12 | 355 | 1997.9.2 23:33:52 | ... |
| ... | ... | ... ... | ... |

FIG. 4

NEGOTIATION TABLE

| USER NO. | GROUP NO. | DAY OF LAST UPDATE | DELETION FLAG | REPLICA DIFFERENTIAL REFLECTION TIME | AUXILIARY MAIN-KEY | NEGOTIATION-RELATED INFORMATION |
|---|---|---|---|---|---|---|
| 12 | 355 | 1997.9.1 23:33:52 | NOT DELETED | 1997.9.2 23:34:52 | 3563 | ... |
| ... | ... | ... | ... | ... | ... | ... |

SYNCHRONIZATION INFORMATION (columns: DAY OF LAST UPDATE, DELETION FLAG, REPLICA DIFFERENTIAL REFLECTION TIME, AUXILIARY MAIN-KEY)

FIG. 5

RELATIONAL DATABASE SYNCHRONIZATION METHOD AND A RECORDING MEDIUM STORING A PROGRAM THEREFORE

BACKGROUND OF THE INVENTION (1) Field of the Invention

The present invention relates to a relational database synchronization method, and more particularly, to a relational database synchronization method for synchronizing data of a relational database held by a master machine with duplications of the same data held by replica machines, which are usually operated in a manner disconnected from the master machine, so that there may be no inconsistency among the data.

(2) Description of the Related Art

Recently, in mobile computing environments, software for use in the field called SFA (Sales Force Automation) has been proposed whereby data about customers is stored in portable information terminals, such as notebook computers, hand-held computers, PDAs (Personal Digital Assistants), etc., and is utilized to increase the chance of success in negotiations, thereby promoting business activities.

In ordinary client/server network environments, a database is used in such a manner that clients access a database server. If, however, the number of accesses from clients is large, the load on the server increases, causing a delay in responding to the clients' requests. In order to enhance the server capabilities and thereby eliminate such a situation, in general, a plurality of servers are provided, thereby distributing the load on the server.

In this case, a server as a master and servers as slaves hold respective log files indicative of their status, so as to manage differentials among master data of the master server and duplications (replicas) of the master data held by the respective slave servers. The master server has as many log files as the number of slave servers, and each slave server has a log file for the master server.

If any one of the servers has updated its data, synchronization of the servers, that is, replication, is performed so that the latest data may be held by all servers. In order to carry out the replication, data write into the databases held by the master and slave servers is inhibited, and with accesses from clients stopped, the log files are exchanged. Since the replication needed for all slaves is proportional in number to the slave servers, such replication is executed strictly according to schedule.

In a mobile computing environment, on the other hand, a server holding master data of a relational database and portable information terminals each holding a replica of the master data are interconnected via a network; however, the connection of each portable information terminal to the server is not permanent, that is, the terminal is connected at an arbitrary point of time and is disconnected after an arbitrary interval of time. Accordingly, the replication of data between the server and each portable information terminal is performed when the portable information terminal is connected to the server, unlike the replication among servers in a client/server system.

Thus, the procedure for replication among servers employed in client/server systems cannot be applied to cases where there are more than several tens of replicas, each portable information terminal holding the replica is connected to the network at an arbitrary point of time and is disconnected therefrom after an arbitrary interval of time, and synchronization between the replica and the master data is performed for each of computers at an arbitrary time.

Specifically, in a client/server system, replicas are used for the purpose of load distribution; therefore, the number of replicas is not very large, and this is the case with the number of log files for the management of differentials among the master data and its replicas. If, however, there are several tens or even several hundreds of replicas, the number of log files that need to be held by the server increases correspondingly, requiring a large disk capacity to store the log files, so that it is not practical to construct such a system.

Also, in a client/server system, replication is performed among the master server and the slave servers strictly according to schedule and the time required to complete the synchronization for all replicas is proportional to the number of replicas; therefore, in an operational environment in which the number of replicas is extremely large, restrictions are imposed on the system operation, for example, the intended performance cannot be achieved.

Further, where an identical record has been updated, there inevitably occurs update contention when the updated data are reflected in the master data. In the case of operation in which data is updated at arbitrary timing, however, data update is not performed sequentially in time and the problem of update contention remains unsolved, impeding normal operation.

In addition, when update contention has occurred in the replication among servers, the only available method for solution is to give priority to the master or to the replica, posing a problem that it is impossible to collect and distribute the current latest and correct data.

SUMMARY OF THE INVENTION

An object of the present invention is to provide a relational database synchronization method for synchronizing data of a relational database held by a master machine with duplications of the same data held by replica machines which are usually operated in a manner disconnected from the master machine.

To achieve the above object, there is provided a relational database synchronization method for synchronizing master data of a relational database held by a master machine with replica data which is a duplication of the master data and is held by each of a large number of replica machines, wherein each replica machine usually operates using the replica data while in an off-line state with respect to the master machine. The relational database synchronization method comprises the step of connecting a replica machine to the master machine at an arbitrary time to make a request for synchronization, the step of extracting, in the replica machine, a record of which a day of last update is later than a master differential extraction completion time, from the replica data as a replica differential, the step of transferring the extracted replica differential to the master machine, the step of extracting, in the master machine, a record of which a replica differential reflection time is later than a master differential extraction completion time, as a master differential from the master data with reference to records held by the replica machine which has made the request for synchronization, and updating the master differential extraction completion time to a current time, the step of causing the replica differential to be reflected in the master data, the step of transferring the master differential and the updated master differential extraction completion time to the replica machine, the step of causing the master differential transferred from the master machine to be reflected in the replica data in the replica machine and updating the master differential extraction completion time held by the replica machine to the transferred master differential extraction completion time, and the step of cutting off the connection between the replica machine and the master machine.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing an example of a duplication management table;

FIG. 5 is a diagram showing an example of arrangement of data in a negotiation table;

DESCRIPTION OF THE PREFERRED EMBODIMENTS

An outline of the present invention will be explained first with reference to the drawings.

Figure 1:
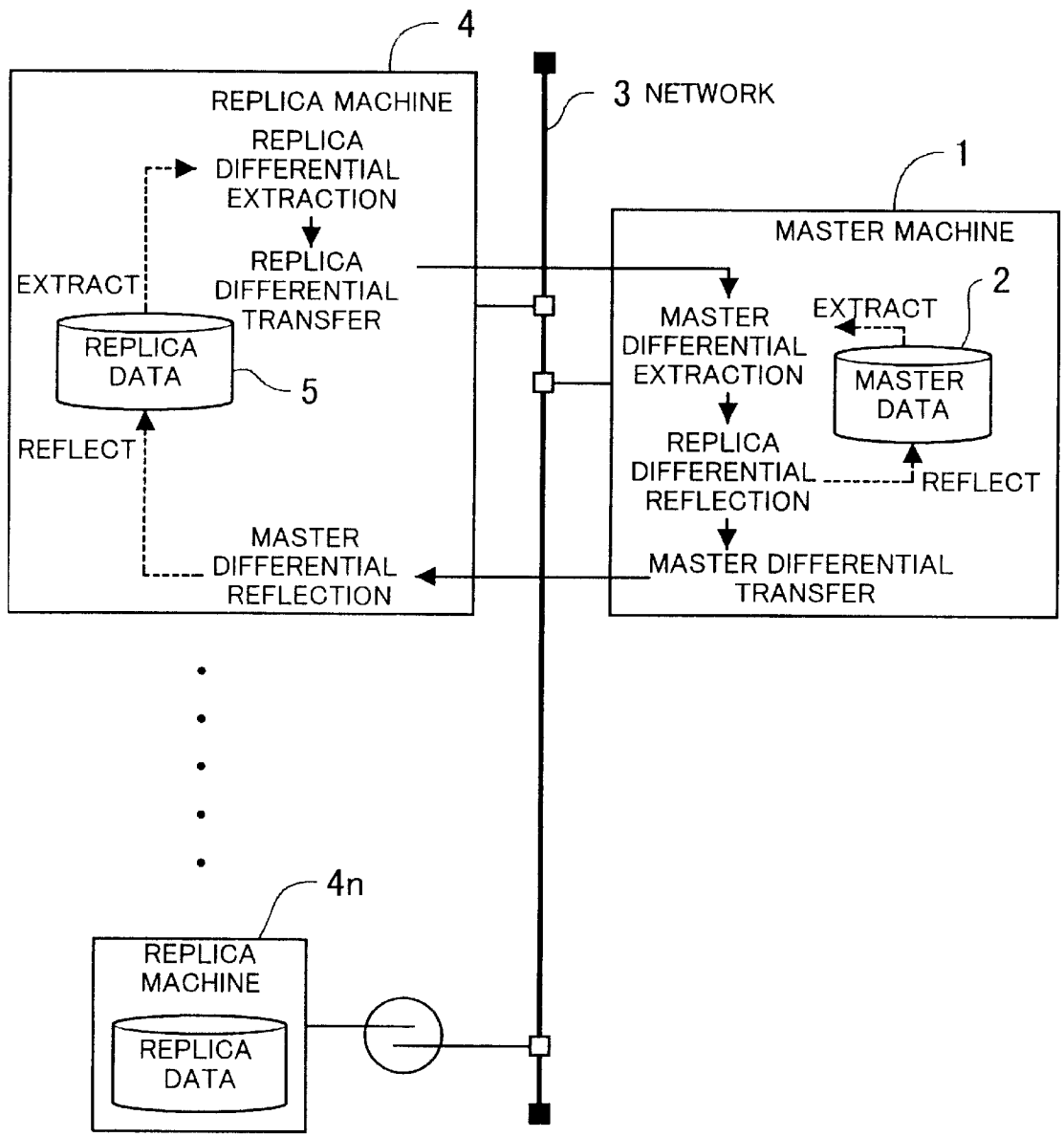
FIG. 1 is a diagram illustrating a theoretical configuration according to the present invention.

FIG. 1 illustrates a theoretical configuration according to the present invention. In FIG. 1, a master machine 1 holds master data 2 of a relational database as common data. The master machine 1 is connected permanently to a network 3. A replica machine 4 holds replica data 5 which is a duplication of part of the master data 2. The replica machine 4 is connected to the master machine 1 through the network 3 at an arbitrary point of time and is disconnected therefrom after an arbitrary interval of time. FIG. 1 shows a state in which the replica machine 4 is connected to the network 3 while a replica machine 4n is disconnected from the network 3. Data update in a replica machine, such as creation of a new record, update of an existing record, or deletion of a record, is usually carried out while the replica machine is disconnected from the network 3, like the replica machine 4n.

In order to synchronize the replica data 5 updated in the replica machine 4n with the master data 2 in the master machine 1, the replica machine 4n is first connected to the master machine 1 through the network 3 at an arbitrary time, like the replica machine 4. Then, the replica machine 4 extracts, from the replica data 5, records of which the day of last update is later than the time of completion of master differential extraction, as replica differentials, and transfers the extracted replica differentials to the master machine 1 through the network 3. With respect to the records held by the replica machine 4 which requested synchronization, the master machine 1 extracts from the master data 2 records of which the time of replica differential reflection is later than a master differential extraction completion time, as master differentials. At this time, the master differential extraction completion time associated with the replica machine 4 which requested synchronization is updated to the current time. Then, the replica differentials are reflected in the master data 2, thereby updating those records in the master data 2 of the master machine 1 which correspond to the records with relatively recent last update dates updated in the replica machine that requested synchronization. Subsequently, the master machine 1 transfers the previously extracted master differentials to the replica machine 4, together with the master differential extraction completion time which was updated to the current time. The replica machine 4 causes the master differentials thus transferred thereto to be reflected in the replica data 5, and updates the master differential extraction completion time held thereby to the thus-transferred master differential extraction completion time. In this manner, records updated separately in a plurality of replica machines are accurately collected in the master machine 1 according to their update times. Also, the records updated in the master machine 1 are accurately distributed to the individual replica machines. The above completes the process for synchronization between the master data 2 and the replica data 5, and therefore, the replica machine 4 may be disconnected from the network 3 at any time thereafter.

An embodiment of the present invention will be now described taking as an example the case where the invention is applied to business activities such that a replica of common data in the master machine is held by each of replica machines which are mobile computers carried by salespersons and that the synchronization process is executed after the salespersons return to their business office.

Figure 2:
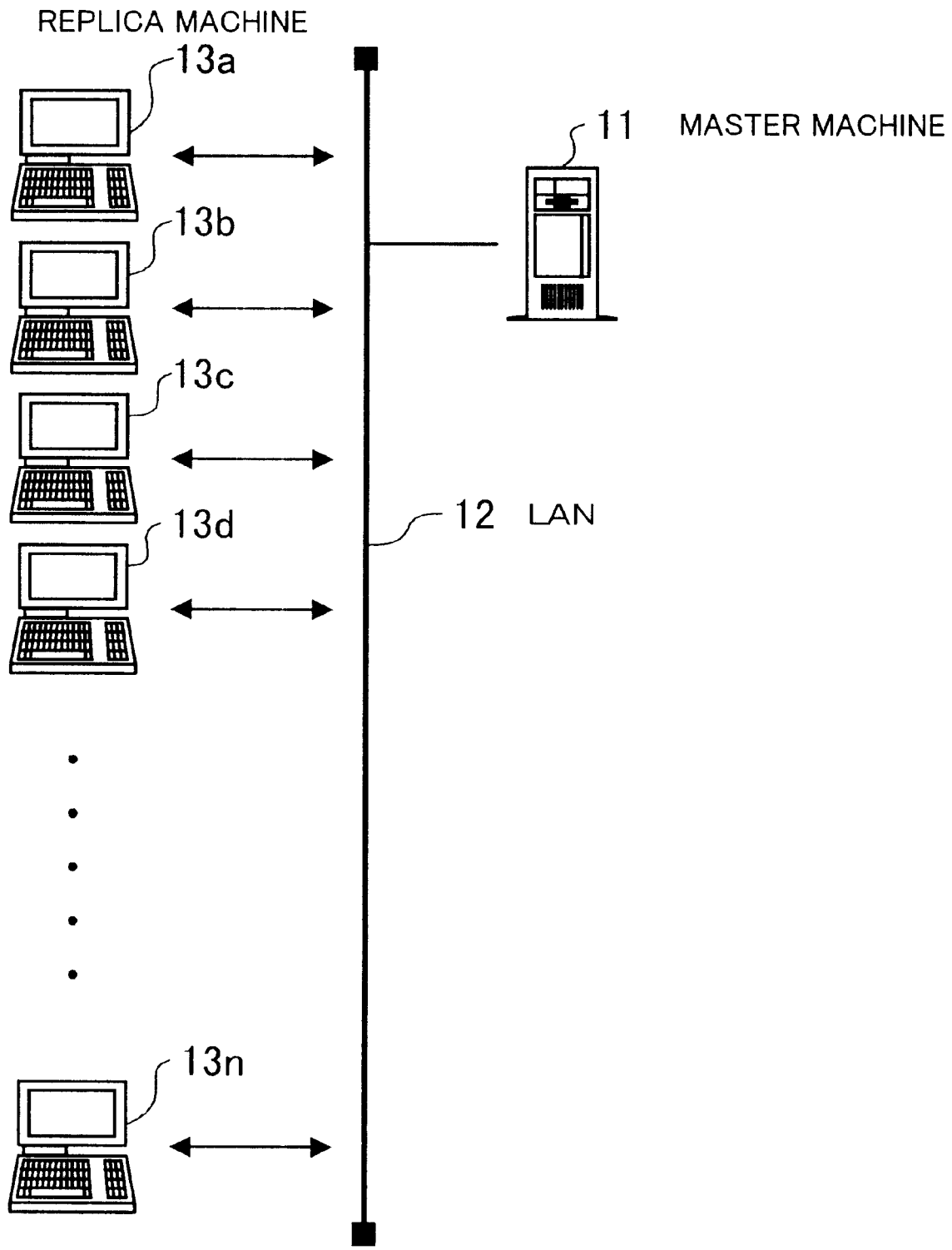
FIG. 2 is a diagram showing the hardware configuration of a negotiation management database system.

FIG. 2 illustrates the hardware configuration of a negotiation management database system. In FIG. 2, a master machine 11, which is a negotiation management database server, is connected to a LAN (Local Area Network) 12, to which a plurality of replica machines 13a to 13n are connected so that they can exchange data. The form of connection between each of the replica machines 13a to 13n and the LAN 12 may be serial connection via a cable connected to a client which in turn is connected to the LAN 12, or infrared connection. Alternatively, a dial-up server, not shown, connected to the LAN 12 may be used so that each replica machine can be connected to the LAN 12 via a modem connected thereto and a public line.

The master machine 11 is provided with a negotiation management database, and each of the replica machines 13a to 13n holds a replica of master data of the negotiation management database. The replica machines 13a to 13n are assigned in such a manner that each salesperson has one replica machine, for example, and are usually used while being disconnected from the LAN 12. For negotiation information updated at places away from the business office, the synchronization process is executed with the replica machines connected to the LAN 12 after the salespersons return to the business office.

The arrangement of the master machine 11 and of the replica machines 13a to 13n will be now described. The replica machines 13a to 13n are identical in arrangement, and therefore, the arrangement of one replica machine 13n will be explained.

Figure 3:
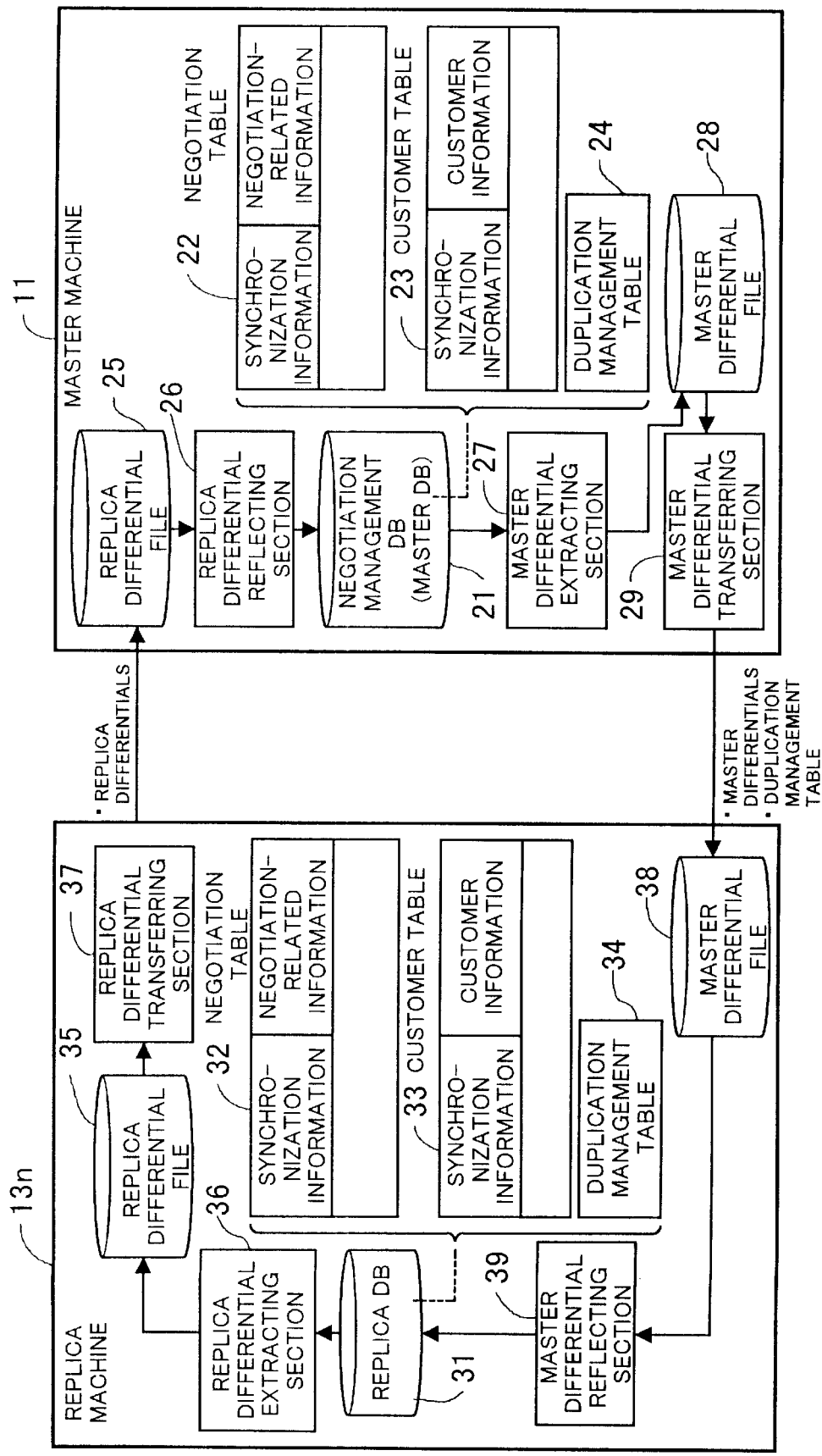
FIG. 3 is a diagram showing an example of how a master machine and a replica machine are configured in relation to a synchronization process.

FIG. 3 illustrates an example of how the master machine and the replica machine are configured in relation to the synchronization process. In FIG. 3, the master machine 11 operates using a negotiation management database (DB) 21 as a master database. Master data of the negotiation management database 21 comprises, for example, a negotiation table 22 and a customer table 23 as tables to be synchronized, and a duplication management table 24. The negotiation table 22 and the customer table 23 individually include synchronization information, besides negotiation-related information and customer information, respectively. The master machine 11 further comprises a replica differential reflecting section 26 for causing a replica differential file 25, transferred thereto from the replica machine 13n, to be reflected in the negotiation management database 21, a master differential extracting section 27 for extracting a master differential file 28 from the negotiation management database 21, and a master differential transferring section 29 for transferring the master differential file 28 to the replica machine 13n.

The replica machine 13n operates using a replica database 31 which is a duplication of part of the master data. Replica data of the replica database 31 comprises a negotiation table 32 and a customer table 33 as tables to be synchronized, and a duplication management table 34, like the counterpart in the master machine 11. The negotiation table 32 and the customer table 33 individually include synchronization information, besides negotiation-related information and customer information, respectively. The replica machine 13n further comprises a replica differential extracting section 36 for extracting a replica differential file 35 from the replica database 31, a replica differential transferring section 37 for transferring the replica differential file 35 to the master machine 11, and a master differential reflecting section 39 for causing a master differential file 38, transferred from the master machine 11, to be reflected in the replica database 31.

FIG. 4 shows an example of the duplication management table. The duplication management table is a table holding update identification information necessary for the synchronization process, and is provided in each of the master machine 11 and the replica machine 13n. The duplication management table is constituted at least by the fields "USER NO.", "GROUP NO.", and "MASTER DIFFERENTIAL EXTRACTION COMPLETION TIME". The "USER NO." is the number assigned to each salesperson for the purpose of identification and is also the number for specifying a replica machine to which a replica is distributed. In many cases, salespersons act in groups, and therefore, "GROUP NO." for specifying each group to which a replica is to be distributed is provided so that data can be shared within the group. Specifically, salespersons belonging to the same sales group may visit an identical customer, and in such cases, a replica of data common to the group often needs to be created so that a salesperson can refer to the information about the negotiations conducted by the salesperson who visited the same customer before. The group number is used to this end. Where a salesperson belongs to a plurality of groups, the respective group numbers are created in the replica machine with the corresponding user number at the time of creation of replica. The "MASTER DIFFERENTIAL EXTRACTION COMPLETION TIME" indicates the time at which master differentials were extracted for the replica machine concerned. For example, provided the example shown in FIG. 4 is the duplication management table in the master machine 11, it means that the salesperson with the user number "12" extracted differentials for the indicated group number from the master machine 11 at the time "23:33:52 on Sept. 2, 1997." On the other hand, if the example shown in FIG. 4 is the duplication management table in the replica machine 13n and the differentials extracted for that group number have been correctly reflected in the replica, then it can be said that the replica is exactly identical in content with the database of the master machine 11 at that point of time.

The tables in the database with respect to which a replica is created for update identification, that is, in this embodiment, the negotiation table and the customer table, individually include synchronization information for the synchronization process, in addition to the negotiation-related information and the customer information, respectively. By way of example, arrangement of data in the negotiation table is shown in FIG. 5.

FIG. 5 illustrates an example of arrangement of data in the negotiation table. The negotiation table is additionally provided with fields for holding the synchronization information in addition to the negotiation-related information. The synchronization information is constituted at least by the fields "USER NO.", "GROUP NO.", "DAY OF LAST UPDATE", "DELETION FLAG", "REPLICA DIFFERENTIAL REFLECTION TIME", and "AUXILIARY MAIN-KEY".

The "USER NO." and the "GROUP NO." are identical respectively with the "USER NO." and the "GROUP NO." in the duplication management table. The "DAY OF LAST UPDATE" indicates the time at which data was updated in the replica machine, and after synchronization, the master machine and all of the replica machines have an identical time set therein. The "DELETION FLAG" is used to record that the record concerned was deleted in the replica machine, and actual deletion of the record is executed following a normal synchronization. The "REPLICA DIFFERENTIAL REFLECTION TIME" indicates the time at which the record updated in the replica machine, that is, the replica differential, was reflected in the negotiation management database of the master machine. The "AUXILIARY MAIN-KEY" is a key which serves as a main-key when combined with the user number. Usually, the main-key is unique within the negotiation management database system and can identify the corresponding record. However, in the case of operations using mobile computers, there is a possibility that the same main-key is created in different replica machines when data is newly added, and accordingly, it is necessary to provide auxiliary main-keys which serve as main-keys when combined with respective user numbers.

Using information in the duplication management table and in the additional fields of the negotiation and customer tables described above, the synchronization process is performed. In the following, the procedure for the synchronization process will be explained with reference to creation of new record, update of record, and deletion of record in that order.

Figure 6:
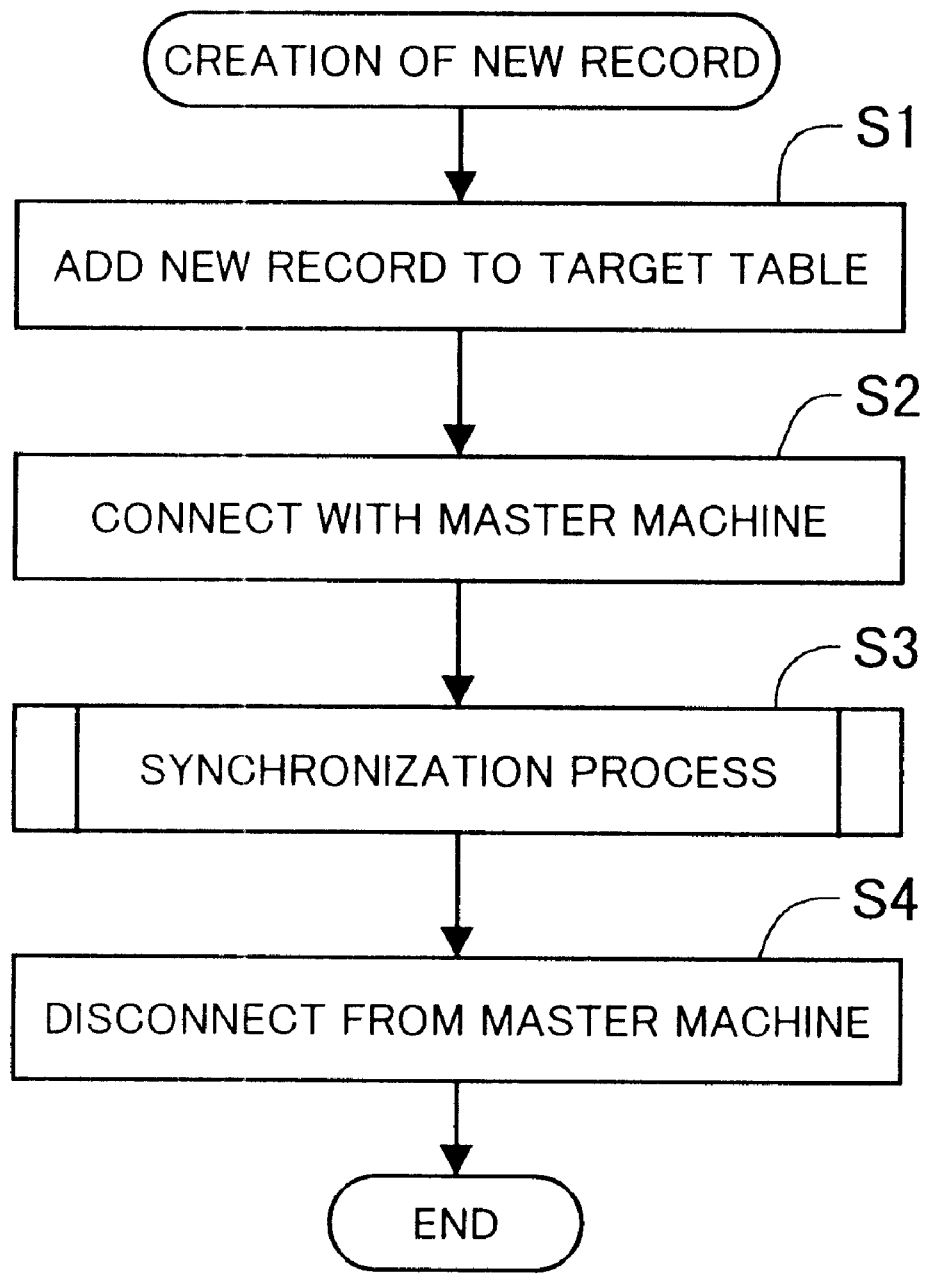
FIG. 6 is a flowchart showing a new record creation process.

FIG. 6 illustrates the flow of a new record creation process. In the case of newly creating a record in a replica machine, first, a new record is added to a target table (Step S1). For example, if the target table is the negotiation table shown in FIG. 5, the user number assigned to this replica machine is set in the "USER NO." field among the fields for the synchronization information in the table. In the "GROUP NO." field is set a group number which the person creating the new record has selected from among the group numbers with the same "USER NO." recorded in the duplication management table. For the "DAY OF LAST UPDATE" field, the time of creation of the new record is acquired from the system clock of the replica machine and is set. In the "DELETION FLAG" field, "NOT DELETED" is set, and in the "REPLICA DIFFERENTIAL REFLECTION TIME" field, nothing needs to be set at this point of time since appropriate data is automatically inserted based on information from the master machine. In the "AUXILIARY MAIN-KEY" field is set a value which is unique with respect to the "USER NO." The individual fields for the negotiation-related information are respectively suitably initialized.

Subsequently, the replica machine is connected to the master machine (Step S2), and the process for synchronization with the master machine is performed (Step S3) to cause the newly created record to be reflected in the negotiation database of the master machine. The synchronization process will be described in detail with reference to FIG. 7. As a final step, the connection with the master machine is cut off at an arbitrary time (Step S4).

Figure 7:
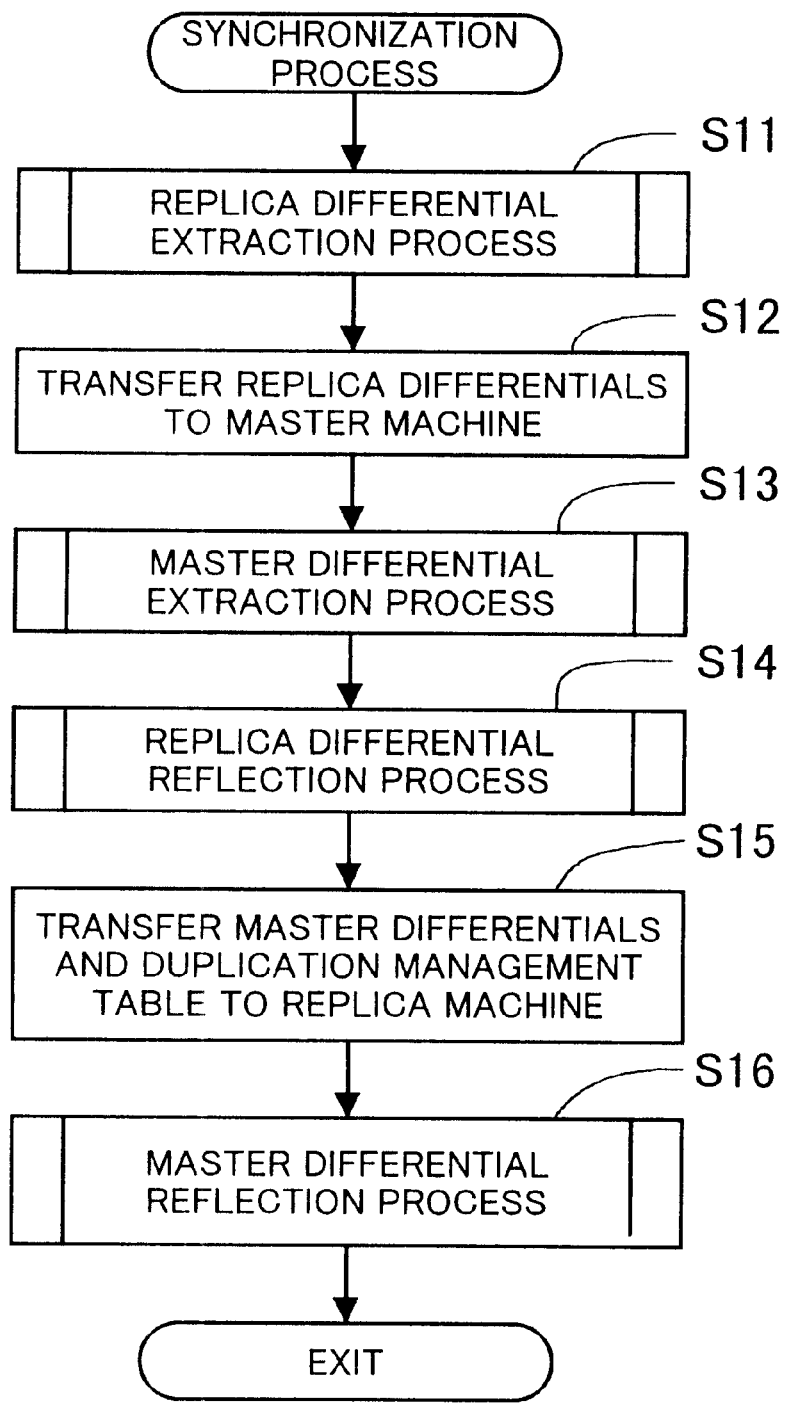
FIG. 7 is a flowchart showing the synchronization process.

FIG. 7 illustrates the flow of the synchronization process. In the synchronization process, first, the updated record, that is, the replica differential, is extracted in the replica machine from its replica database (Step S11). Details of the replica differential extraction process will be explained with reference to FIG. 8. The replica differential is then transferred to the master machine (Step S12). After receiving the replica differential, the master machine extracts records that had been updated before the connection with the replica machine, from the master data of the negotiation management database, that is, it performs a master differential extraction process (Step S13). Subsequently, the master machine carries out a reflection process to cause the replica differential to be reflected in the master data of the negotiation management database (Step S14), and transfers the master differential and the duplication management table to the replica machine (Step S15). The master differential extraction process and the replica differential reflection process will be described in detail later with reference to FIGS. 9 and 10, respectively. The replica machine then causes the master differential, transferred thereto from the master machine, to be reflected in its replica database (Step S16). Details of the master differential reflection process will be explained with reference to FIG. 11.

Figure 8:
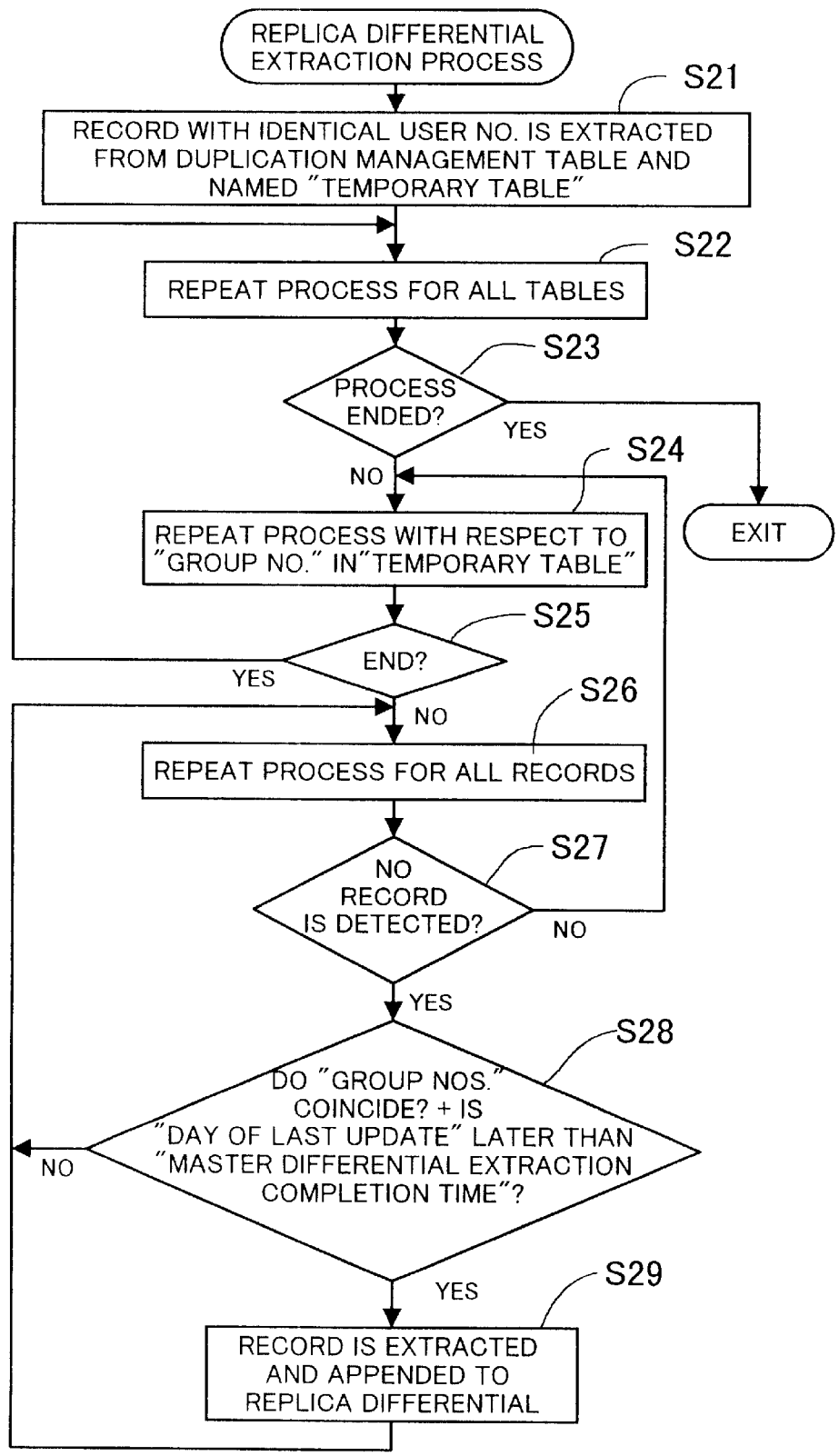
FIG. 8 is a flowchart showing a replica differential extraction process.

FIG. 8 illustrates the flow of the replica differential extraction process. In the replica differential extraction process performed in a replica machine, first, one record of which "USER NO." is identical with the user number assigned to this replica machine is extracted from the duplication management table, and is stored in a table named "temporary table" for reference (Step S21). Then, the process described below is repeatedly executed for all tables including the negotiation table and the customer table (Step S22). First, it is determined whether or not the process has been completed for all the tables (Step S23), and if the process has been completed for all the tables, the replica differential extraction process is ended.

The "GROUP NO." is then extracted from the record stored in the temporary table, and records of which the "GROUP NO." is identical with the extracted group number are extracted from the current table such as the negotiation table or the customer table (Step S24). It is determined whether or not the extraction process has been completed for the current table (Step S25), and if the extraction process has been completed for this table, the flow returns to Step S22 to execute the process for the next table. Then, with respect to the individual extracted records, the process stated below is repeatedly executed (Step S26). A determination is made as to whether no record is detected (Step S27), and if no record is detected, the flow returns to Step S24 to extract next records. If a record is detected, then, the "DAY OF LAST UPDATE" in the current record extracted with the use of the "GROUP NO." is compared with the "MASTER DIFFERENTIAL EXTRACTION COMPLETION TIME" in the duplication management table (Step S28). In this case, if the "DAY OF LAST UPDATE" is earlier than the "MASTER DIFFERENTIAL EXTRACTION COMPLETION TIME", the flow returns to Step S26 to check up the next record; if the "DAY OF LAST UPDATE" is later than the "MASTER DIFFERENTIAL EXTRACTION COMPLETION TIME", the record is extracted and appended to the replica differential file to be saved (Step S29), whereupon the flow returns to Step S26. Thus, new records can be extracted from among the records of the same group in each of the tables including the negotiation table and the customer table.

Figure 9:
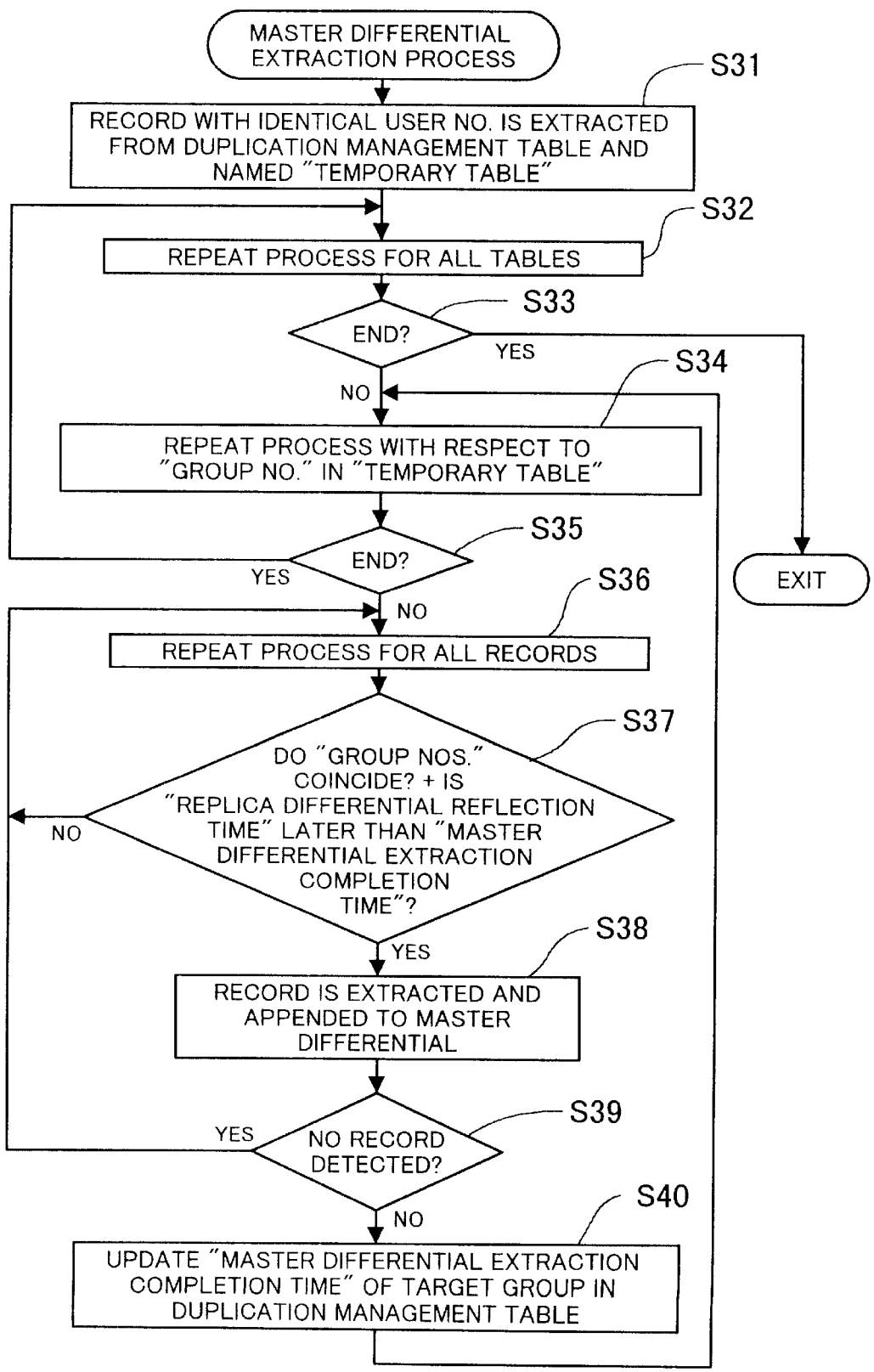
FIG. 9 is a flowchart showing a master differential extraction process.

FIG. 9 illustrates the flow of the master differential extraction process. After the replica differential is transferred to the master machine, the master machine first carries out the master differential extraction process. First, in the master differential extraction process, records with the same "USER NO." as that of the replica which has requested the process are extracted from the duplication management table and stored in a "temporary table" (Step S31). Then, the process stated below is executed for all tables including the negotiation table and the customer table (Step S32). It is first determined whether or not the process has been completed for all the tables (Step S33), and if the process has been completed for all the tables, the master differential extraction process is ended.

The "GROUP NO." is then extracted from the record stored in the temporary table, and records of which "GROUP NO." is identical with the extracted group number are extracted from the current table such as the negotiation table or the customer table (Step S34). It is determined whether or not the extraction process has been completed for the current table (Step S35), and if the extraction process has been completed for the current table, the flow returns to Step S32 to execute the process for the next table. Then, with respect to the individual extracted records, the process stated below is executed (Step S36). Specifically, the "REPLICA DIFFERENTIAL REFLECTION TIME" in the current record extracted with the use of the GROUP NO." is compared with the "MASTER DIFFERENTIAL EXTRACTION COMPLETION TIME" in the duplication management table (Step S37). If the "REPLICA DIFFERENTIAL REFLECTION TIME" in the record is earlier than the "MASTER DIFFERENTIAL EXTRACTION COMPLETION TIME", the flow returns to Step S36 to check up the next record; if the "REPLICA DIFFERENTIAL REFLECTION TIME" is later than the "MASTER DIFFERENTIAL EXTRACTION COMPLETION TIME", the record is extracted and appended to the master differential file to be saved (Step S38). Subsequently, it is determined whether no record is detected (Step S39), and if a record is detected, the flow returns to Step S36 to extract the record. When the process has been completed for all the required records in the current table, the "MASTER DIFFERENTIAL EXTRACTION COMPLETION TIME" in the duplication management table is updated to the current time (Step S40).

Figure 10:
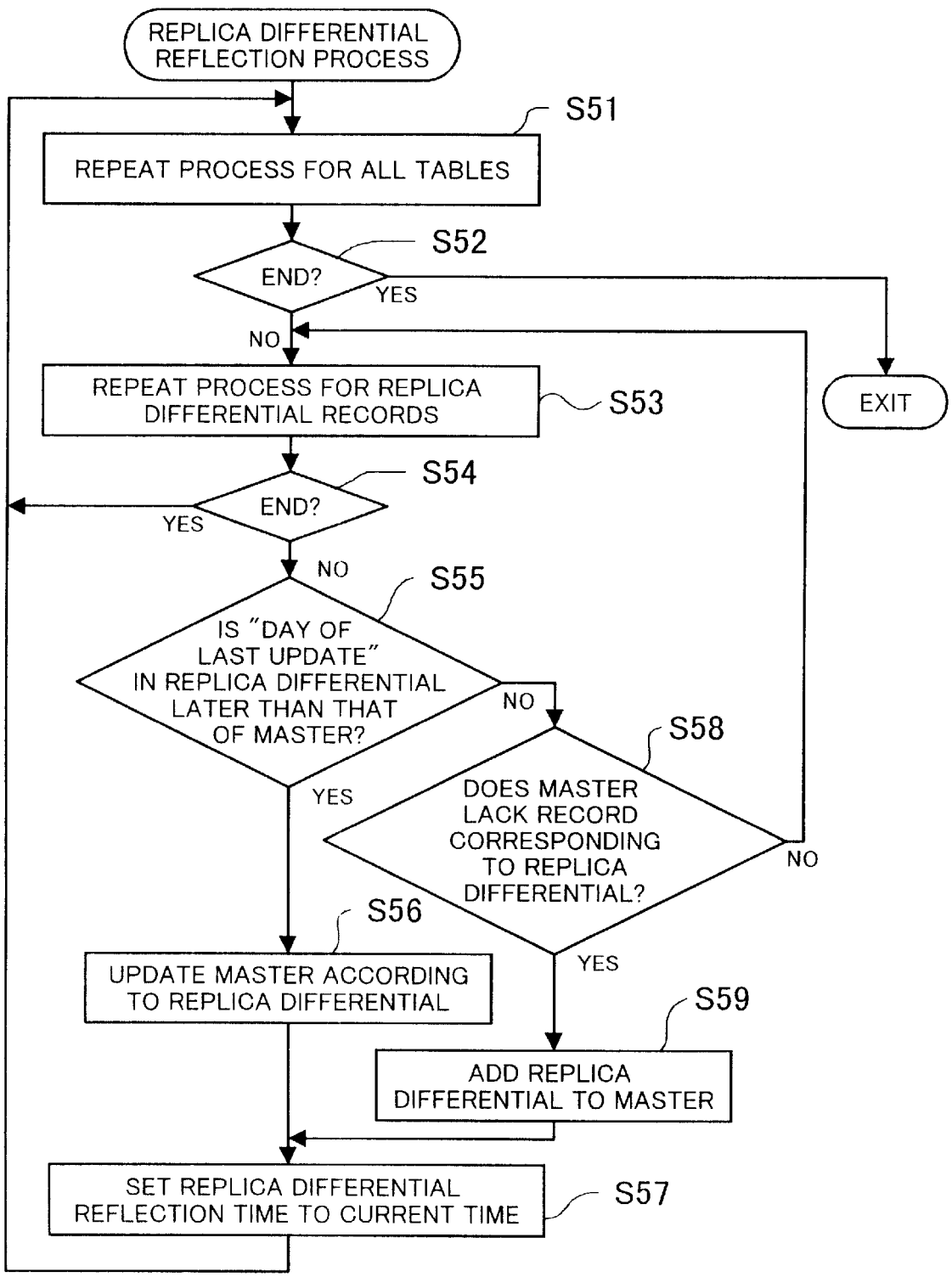
FIG. 10 is a flowchart showing a replica differential reflection process.

FIG. 10 illustrates the flow of the replica differential reflection process. Where the replica differentials transferred from a replica machine are to be reflected in the negotiation management database of the master machine, the process described below is carried out for all tables including the negotiation table and the customer table (Step S51). It is determined whether or not the process has been completed for all the tables (Step S52), and if the process has been completed for all the tables, the replica differential reflection process is ended. The process stated below is repeatedly executed for the records of the replica differentials (Step S53). A determination is made as to whether no record is detected (Step S54), and if no record is detected, the flow goes back to Step S51. If a record is detected, comparison is made with respect to records extracted in the temporary table and having an identical key combination of "USER NO." and "AUXILIARY MAIN-KEY" to compare the "DAY OF LAST UPDATE" in the replica differential with that in the master differential (Step S55). If the replica differential has a later "DAY OF LAST UPDATE", the record in the master data is updated (Step S56), and the current time is set as the replica differential reflection time (Step S57). The flow then returns to Step S51 so that the above operations may be performed for all the tables. If, in Step S55, it is judged that the "DAY OF LAST UPDATE" in the replica differential is not later than the "DAY OF LAST UPDATE" in the master differential or that there is no master differential to be compared with the replica differential record, it is determined whether or not the master has a record corresponding to the replica differential (Step S58). If the master includes a record corresponding to the replica differential and if the record has a later "DAY OF LAST UPDATE", then there is no need for update, and accordingly, the flow returns to Step S53. If the replica differential was newly created in the replica machine, the master does not have a record corresponding to the replica differential; therefore, the replica differential is added to the master (Step S59), and the replica differential reflection time is changed to the current time.

The master machine thereafter transfers the master differential file and a file of the duplication management table to the replica machine, which then carries out the reflection process to cause the master differentials to be reflected in the replica database and an update process to update the duplication management table.

Figure 11:
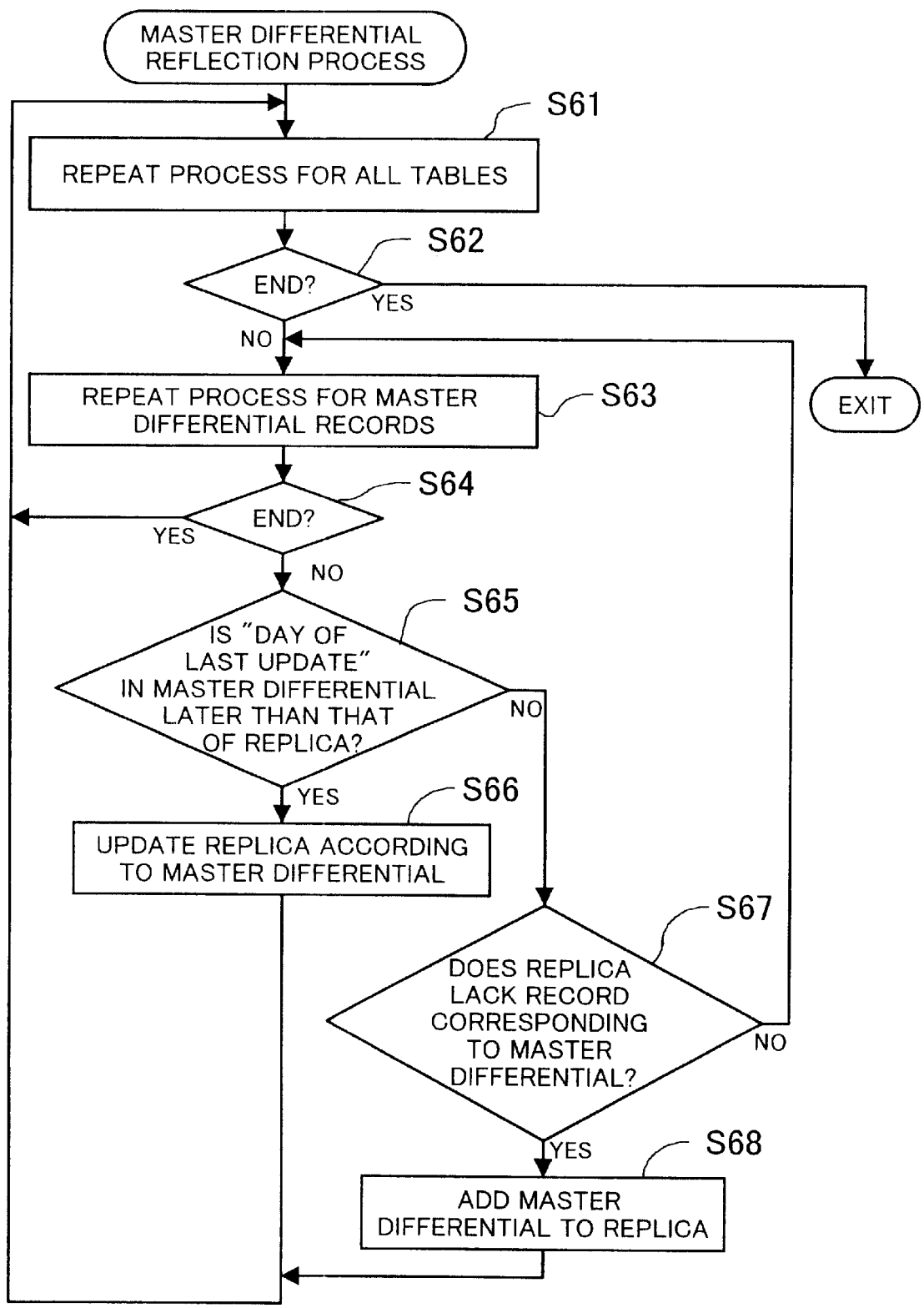
FIG. 11 is a flowchart showing a master differential reflection process.

FIG. 11 illustrates the flow of the master differential reflection process. Where the master differentials transferred from the master machine are to be reflected in the replica database of the replica machine, the process described below is executed for all tables including the negotiation table and the customer table (Step S61). It is determined whether or not the process has been completed for all the tables (Step S62), and if the process has been completed for all the tables, the master differential reflection process is ended. The process stated below is repeatedly executed for master differential records (Step S63). A determination is made as to whether no record is detected (Step S64), and if no record is detected, the flow returns to Step S61 to execute the process for the next table. If a record is detected, comparison is made with respect to records having an identical key combination of "USER NO." and "AUXILIARY MAIN-KEY" for comparison of the "DAY OF LAST UPDATE" in the master differential (Step S65). If the master differential has a later "DAY OF LAST UPDATE", the corresponding record in the replica data is updated according to the master differential and the duplication management table is replaced by the new duplication management table transferred to the replica machine (Step S66). If, in Step S65, it is judged that the master differential does not have a later "DAY OF LAST UPDATE" or that the replica has no record to be compared, it is determined whether or not the replica has a record corresponding to the master differential (Step S67). If the replica includes a record corresponding to the master differential and if the record has a later "DAY OF LAST UPDATE", then there is no need for update, and accordingly, the flow returns to Step S63. If the replica does not have a record corresponding to the master differential, the master differential is added to the replica (Step S68).

The synchronization process executed in the case of record update will be now described.

Figure 12:
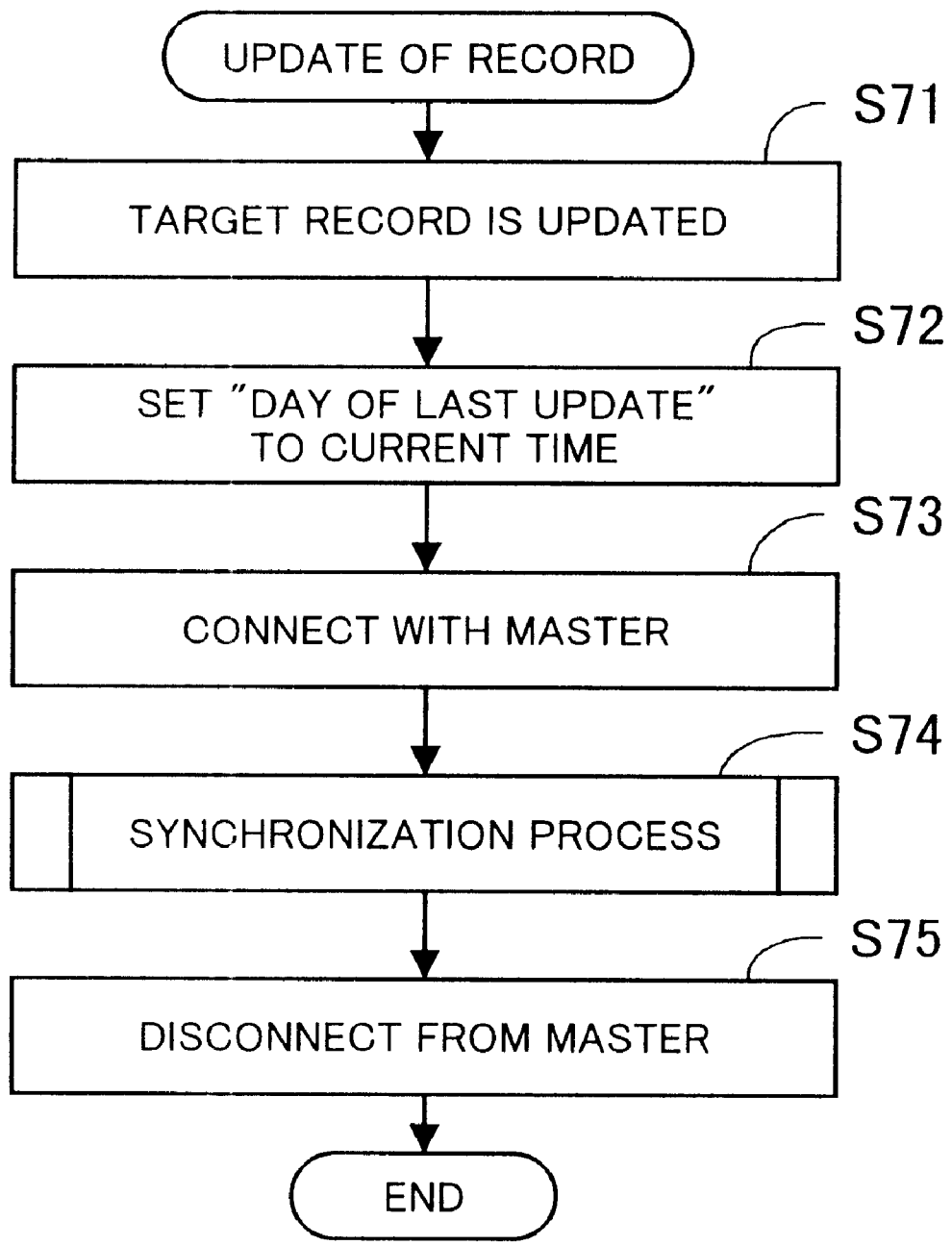
FIG. 12 is a flowchart showing the synchronization process executed when a record has been updated in a replica machine.

FIG. 12 illustrates the flow of the synchronization process executed when a record has been updated in a replica machine. Where an existing record is to be updated in a replica machine, the procedure described below is followed. First, a user area of a target record as in the negotiation table or the customer table of the replica machine, that is, the negotiation-related information in the negotiation table exclusive of the synchronization information or the customer information in the customer table exclusive of the synchronization information, is updated as requested by the user (Step S71). The "DAY OF LAST UPDATE" in the synchronization information of the updated record is set to the current updated time (Step S72). Then, the replica machine is connected to the master machine (Step S73), the synchronization process shown in FIG. 7 is executed (Step S74), and the replica machine is disconnected from the master machine (Step S75).

The synchronization process executed in the case of record deletion will be now described.

Figure 13:
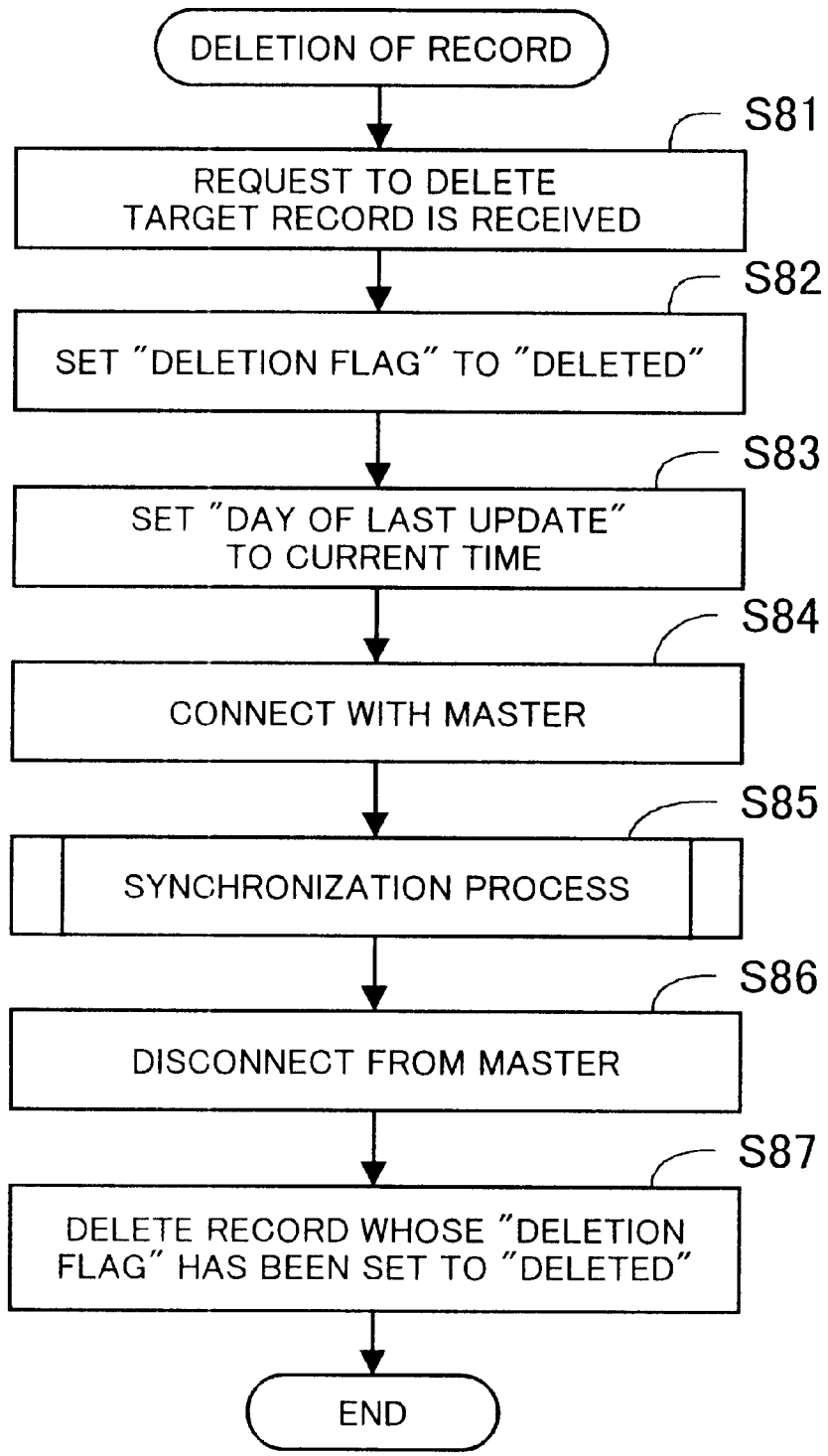
FIG. 13 is a flowchart showing the synchronization process executed when a record has been deleted in a replica machine.

FIG. 13 illustrates the flow of the synchronization process executed when a record is to be deleted in a replica machine. Where an existing record is deleted in a replica machine, the procedure described below is followed. A request to delete a target record is received (Step S81); in this case, however, the record is not immediately deleted. The "DELETION FLAG" in the synchronization information of the record in question is changed from "NOT DELETED" to "DELETED" (Step S82), and the "DAY OF LAST UPDATE" is set to the current time of deletion of the record (Step S83). Then, the replica machine is connected to the master machine and the synchronization process is carried out (Steps S84, S85). After the replica machine is disconnected from the master machine (Step S86) upon completion of the synchronization process, it searches the individual tables for a record of which "DELETION FLAG" has been set to "DELETED", and deletes such a record with its "DELETION FLAG"set to "DELETED", if any (Step S87).

The following is a description of a relational database synchronization method according to another embodiment of the present invention whereby the time of connection with the master machine for the synchronization process is shortened.

Figure 14:
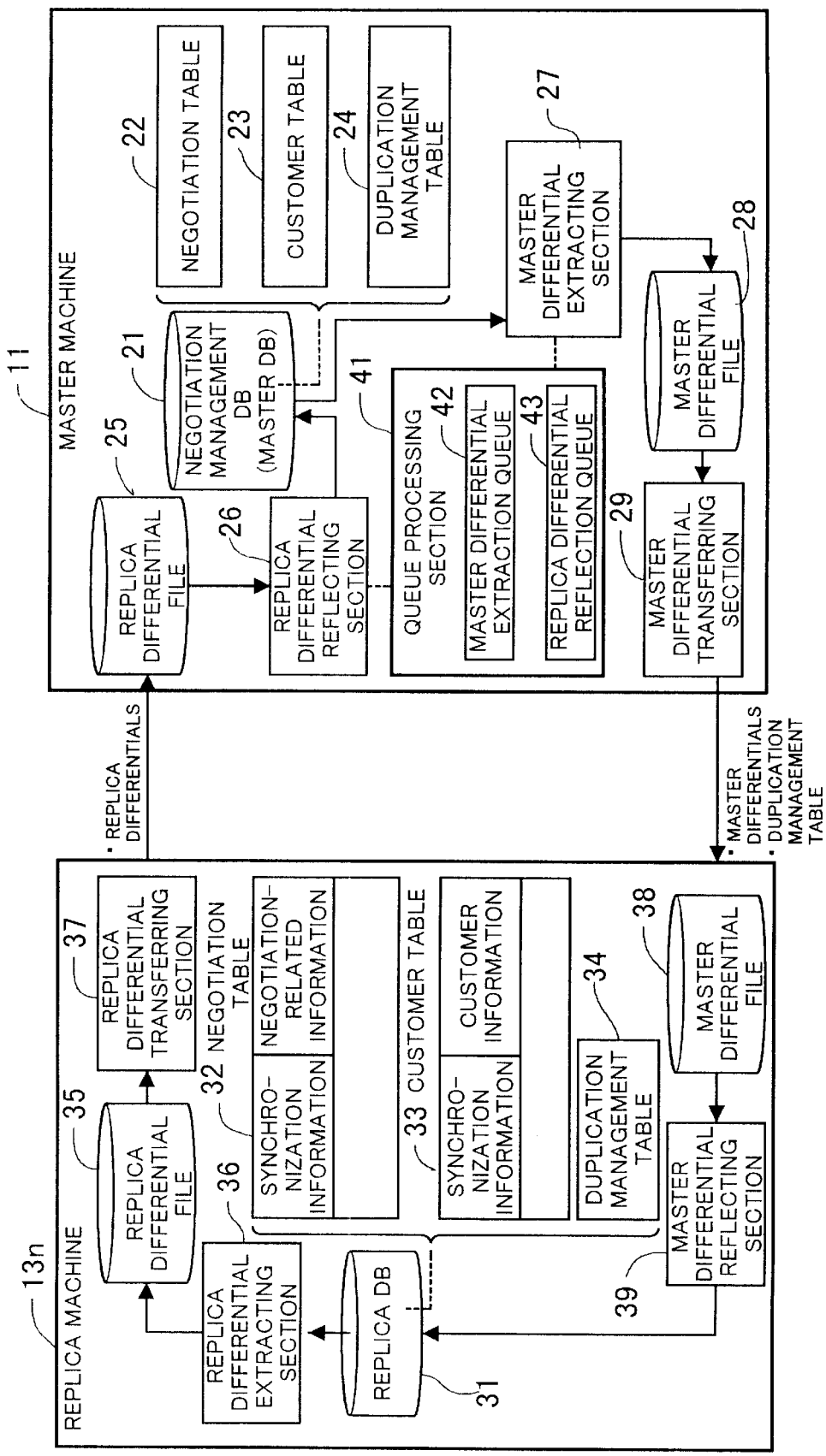
FIG. 14 is a diagram showing an example of how a master machine and a replica machine are configured according to a second embodiment.

FIG. 14 illustrates an example of how a master machine and a replica machine are configured according to the second embodiment. In FIG. 14, identical reference numerals are used to denote component parts identical with those appearing in FIG. 3 and detailed explanation of such component parts is omitted. As shown in FIG. 14, the replica machine 13n of the second embodiment has an arrangement identical with that of the first embodiment, while the master machine 11 is additionally provided with a queue processing section 41 for managing the order of execution of the master differential extraction process and the replica differential reflection process. The queue processing section 41 includes a master differential extraction queue 42 and a replica differential reflection queue 43.

With the above arrangement, the process for synchronization between the master data and the replica data is carried out in the master machine 11 and the replica machine 13n, as described below.

Figure 15:
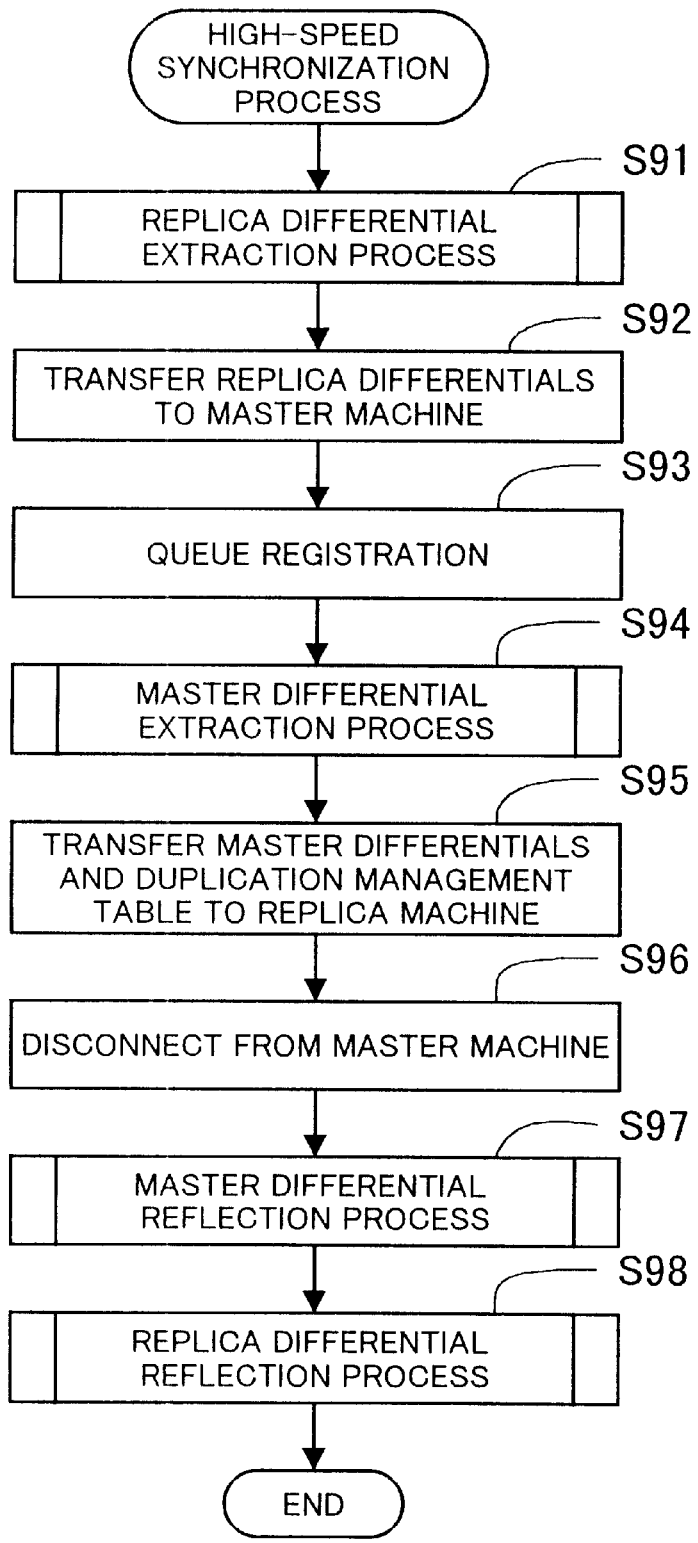
FIG. 15 is a flowchart showing a fast synchronization process.

FIG. 15 illustrates the flow of a high-speed synchronization process. Where a new record has been created or an existing record has been updated or deleted in a replica machine, the synchronization process therefor is executed following the procedure described below. First, after the replica machine and the master machine are connected to each other, the replica machine creates replica differentials (Step S91) following the procedure shown in FIG. 8, and then transfers the created replica differentials to the master machine (Step S92). The master machine then performs queue registration (Step S93). When the turn to execute processing for the connected replica machine has come around, the master machine performs the master differential extraction process (Step S94) following the procedure shown in FIG. 9, and transfers the master differentials and the duplication management table to the replica machine (Step S95). The connection between the replica machine and the master machine is cut off thereafter (Step S96) without the confirmation of reflection of the replica differentials. The replica machine then causes the master differentials, transferred thereto from the master machine, to be reflected in the replica database following the procedure shown in FIG. 11, and updates the duplication management table (Step S97). When the turn to execute processing for the already disconnected replica machine has come around, the master machine performs the reflection process to cause the replica differentials to be reflected in the negotiation management database (Step S98), following the procedure shown in FIG. 10. The replica differential reflection process in Step S98 is executed by batch processing in the nighttime, for example. Thus, the master machine releases the negotiation management database immediately after transferring the master differentials and the duplication management table to the replica machine, and performs the replica differential reflection process at a later time, whereby the connection between the master machine and the replica machine can be cut off at an earlier time and the synchronization process can be speeded up.

The process performed by the replica machine is identical with that shown in FIG. 3 except for the timing of disconnection; therefore, in the following will be explained only the processes performed by the master machine 11, that is, the queue registration in Step S93, the master differential extraction process in Step S94, and the master differential reflection process in Step S97.

Figure 16:
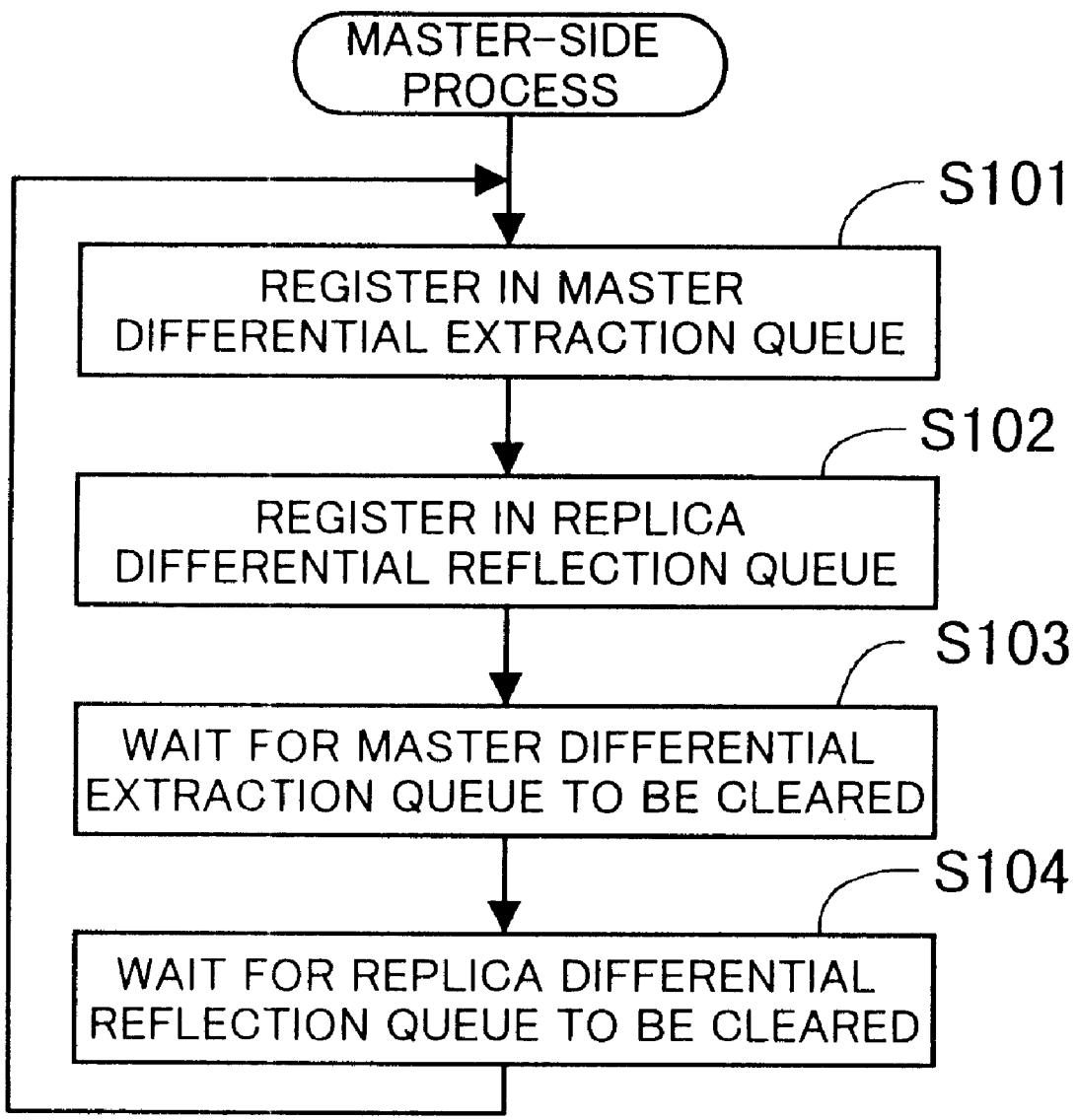
FIG. 16 is a flowchart showing a process executed on the master side.
Figure 17:
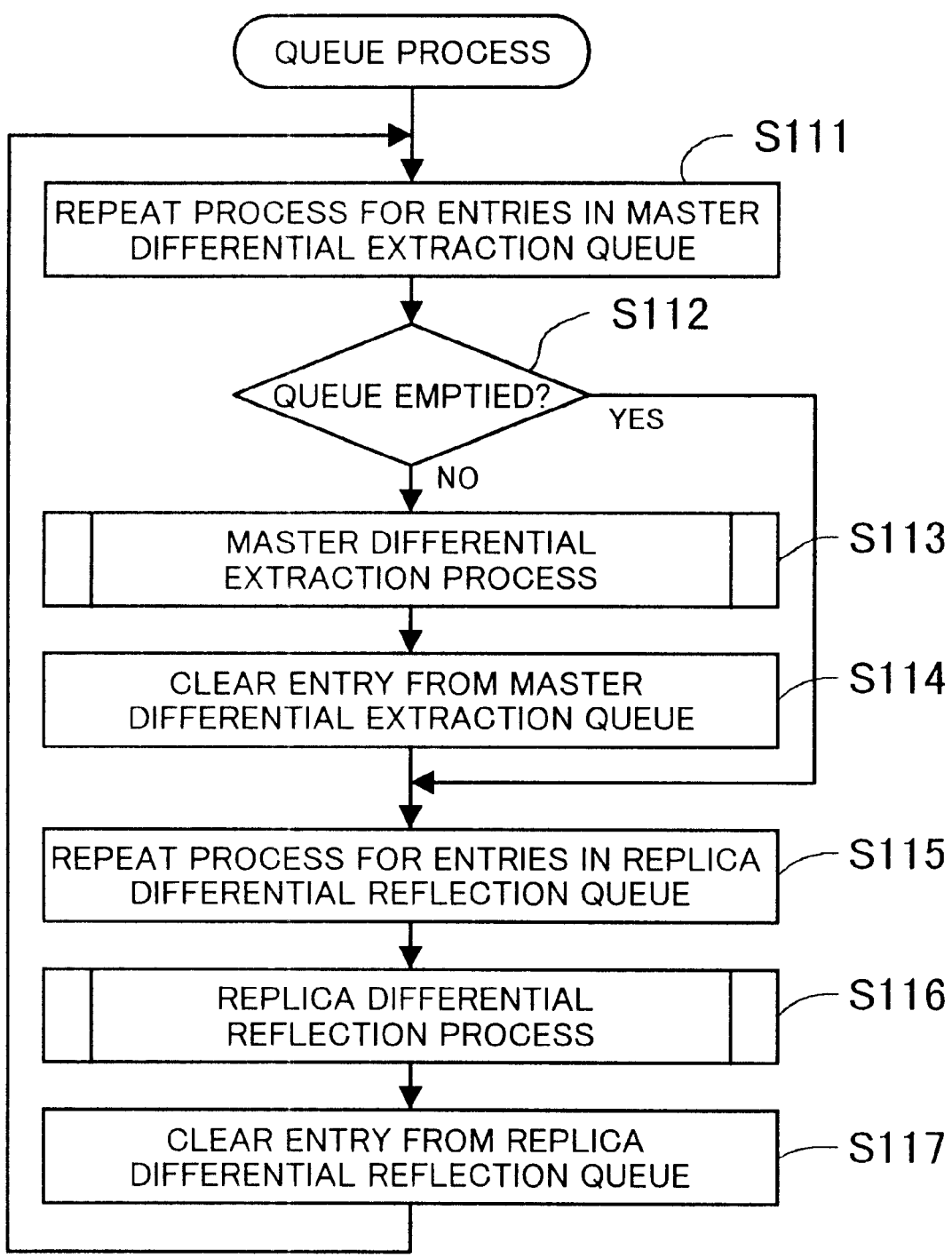
FIG. 17 is a flowchart showing a queue process.

FIG. 16 shows the flow of a process executed on the master side, and FIG. 17 shows the flow of a queue process. First, in FIG. 16, when the synchronization process has been requested from a replica machine, the queue processing section 41 registers the user number of the replica machine in the master differential extraction queue 42 (Step S101) and also registers the user number in the replica differential reflection queue 43 (Step S102). Then, in the queue process of FIG. 17 executed separately from this process, the queue processing section waits for the master differential extraction queue 42 to be cleared (Step S103), and also waits for the replica differential reflection queue 43 to be cleared (Step S104). This process is repeatedly executed each time the synchronization process is requested.

In the queue process, the master differential extraction process is carried out in preference to the replica differential reflection process. Specifically, the master differential extraction process described below is repeatedly executed for individual entries in the master differential extraction queue 42 in order of registration (Step S111). It is determined whether or not the master differential extraction queue 42 is empty (Step S112), and if there is an entry in the queue, the succeeding process is continued. The master differential extraction process is then performed (Step S113) following the procedure shown in FIG. 9, and upon completion of the extraction of master differentials, the master differential extraction queue 42 is cleared of the entry for which the extraction has been completed (Step S114). When the master differential extraction queue 42 has thereafter become empty, the replica differential reflection process described below is repeatedly executed for individual entries in the replica differential reflection queue 43 in order of registration (Step S115). Specifically, the replica differential reflection process is performed (Step S116) following the procedure shown in FIG. 10, and upon completion of the replica differential reflection process, the replica differential reflection queue 43 is cleared of the entry for which the reflection of replica differentials has been completed (Step S117). When the replica differential reflection process has been completed for all waiting data, the flow waits for new registration in the master differential extraction queue 42, and if data is newly registered, the master differential extraction process is started in like manner.

As described above, according to the present invention, a replica machine is connected to a master machine at an arbitrary time, a record of which the day of last update is later than the master differential extraction completion time is extracted from replica data as a replica differential, the replica differential is transferred to the master machine, a record of which the replica differential reflection time is later than the master differential extraction completion time is extracted from master data as a master differential, the master differential extraction completion time is updated to the current time, the replica differential is reflected in the master data, the master differential and the master differential extraction completion time are transferred to the replica machine, the master differential is reflected in the replica data, and the master differential extraction completion time is updated to the thus-transferred master differential extraction completion time. This permits replica data in individual replica machines, updated separately while the replica machines are disconnected from the master machine, to be accurately collected in accordance with their update time, and also permits data updated until then in the master machine to be accurately distributed to the individual replica machines, whereby the individual replica machines can be connected to the network at an arbitrary time and disconnected therefrom after being connected for an arbitrary interval of time and the synchronization timing can be freely set.

Also, data necessary for synchronization is extracted in both the master machine side and the replica machine side each time the synchronization process is executed, and thus it is not necessary for the master machine to create a transaction log for each of the replica machines. Accordingly, increase in the number of replica machines does not entail increase in the disk area (transaction area), thus making it possible to save the disk capacity.

Further, the connection between the replica machine and the master machine may be cut off following the transfer of master differentials to the replica machine, and the reflection of replica differentials in the master machine may be executed later by batch processing, in which case the connection between the replica machine and the master machine can be cut off at an early time and thus the synchronization process can be speeded up.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A relational database synchronization method for synchronizing master data of a relational database held by a master machine with replica data which is a duplication of the master data and is held by each of a large number of replica machines, each replica machine usually operating with use of the replica data while in an off-line state with respect to the master machine, said relational database synchronization method comprising:

connecting a replica machine to the master machine at an arbitrary time to make a request for synchronization;

extracting, in said replica machine, a record of which a day of last update is later than a master differential extraction completion time, from the replica data as a replica differential;

transferring the extracted replica differential to the master machine;

extracting, in the master machine, a record of which a replica differential reflection time is later than a master differential extraction completion time, as a master differential from the master data with reference to records held by said replica machine which has made the request for synchronization, and updating the master differential extraction completion time to a current time;

causing the replica differential to be reflected in the master data;

transferring the master differential and the updated master differential extraction completion time to said replica machine;

causing the master differential transferred from the master machine to be reflected in the replica data in said replica machine, and updating the master differential extraction completion time held by said replica machine to the transferred master differential extraction completion time; and cutting off the connection between said replica machine and the master machine.

2. The relational database synchronization method according to claim 1, wherein the master data and the replica data each comprise a table to be synchronized, and a duplication management table.

3. The relational database synchronization method according to claim 2, wherein the duplication management table stores a user number for identifying said replica machine, a group number for identifying a group including two or more of the replica machines, and the master differential extraction completion time.

4. The relational database synchronization method according to claim 2, wherein the table to be synchronized stores a user number for identifying said replica machine, a group number for identifying a group including two or more of the replica machines, the day of last update on which a record was updated in said replica machine, a deletion flag for recording deletion made in said replica machine, the replica differential reflection time, and an auxiliary main-key serving as a main-key for uniquely specifying a user when combined with the user number.

5. A relational database synchronization method for synchronizing master data of a relational database held by a master machine with replica data which is a duplication of the master data and is held by each of a large number of replica machines, each replica machine usually operating with use of the replica data while in an off-line state with respect to the master machine, said relational database synchronization method comprising:

connecting a replica machine to the master machine at an arbitrary time to make a request for synchronization;

extracting, in said replica machine, a record of which a day of last update is later than a master differential extraction completion time, from the replica data as a replica differential;

transferring the extracted replica differential to the master machine;

registering said replica machine which has made the request for synchronization, in a master differential extraction queue in the master machine;

registering said replica machine which has made the request for synchronization, in a replica differential reflection queue in the master machine;

extracting a record of which a replica differential reflection time is later than a master differential extraction completion time, as a master differential from the master data with reference to records held by said replica machine which has made the request for synchronization and updating the master differential extraction completion time to a current time when a turn for said replica machine has come in the master differential extraction queue;

transferring the master differential and the updated master differential extraction completion time to said replica machine;

cutting off the connection between said replica machine and the master machine;

causing the master differential transferred from the master machine to be reflected in the replica data in said replica machine, and updating the master differential extraction completion time held by said replica machine to the transferred master differential extraction completion time; and causing the replica differential to be reflected in the master data when a turn for said replica machine which made the request for synchronization has come in the replica differential reflection queue.

6. The relational database synchronization method according to claim 5, wherein the master data and the replica data each comprise a table to be synchronized, and a duplication management table.

7. The relational database synchronization method according to claim 6, wherein the duplication management table stores a user number for identifying said replica machine, a group number for identifying a group including two or more of the replica machines, and the master differential extraction completion time.

8. The relational database synchronization method according to claim 6, wherein the table to be synchronized stores a user number for identifying said replica machine, a group number for identifying a group including two or more of the replica machines, the day of last update on which a record was updated in said replica machine, a deletion flag for recording deletion made in said replica machine, the replica differential reflection time, and an auxiliary main-key serving as a main-key for uniquely specifying a user when combined with the user number.

9. The relational database synchronization method according to claim 5, wherein said causing the replica differential to be reflected in the master data is executed by batch processing at night.

10. A computer-readable recording medium storing a relational database synchronization program which includes master differential extracting means for extracting a record of which a replica differential reflection time is later than a master differential extraction completion time, as a master differential from master data of a relational database of a master machine with reference to records of replica data held by a replica machine which has made a request for synchronization, and for updating the master differential extraction completion time to a current time, master differential transferring means for transferring the master differential and the updated master differential extraction completion time to the replica machine, master differential reflecting means for causing the master differential transferred by said master differential transferring means to be reflected in the replica data and for updating the master differential extraction completion time held by the replica machine to the transferred master differential extraction completion time, replica differential extracting means for extracting a record of which a day of last update is later than the master differential extraction completion time, from the replica data as a replica differential, replica differential transferring means for transferring the replica differential extracted by said replica differential extracting means to the master machine, replica differential reflecting means for causing the replica differential transferred by said replica differential transferring means to be reflected in the master data, and queue processing means for managing order of execution of said master differential extracting means and said replica differential reflecting means.

* * * * *